(12) United States Patent
Damera-Venkata

(10) Patent No.: US 7,420,709 B2
(45) Date of Patent: Sep. 2, 2008

(54) DITHER MATRIX GENERATION

(75) Inventor: Niranjan Damera-Venkata, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 841 days.

(21) Appl. No.: 10/427,766

(22) Filed: Apr. 30, 2003

(65) Prior Publication Data

US 2004/0218222 A1 Nov. 4, 2004

(51) Int. Cl.
*H04N 1/405* (2006.01)
*G06K 9/36* (2006.01)

(52) U.S. Cl. .................. 358/3.13; 358/3.06; 358/2.1; 382/237

(58) Field of Classification Search .............. 358/3.13, 358/3.14, 3.16, 3.19, 4.16, 3.04, 3.05, 3.06, 358/3.17, 3.18, 1.9, 2.1, 3.1, 3.23; 345/596; 382/169, 237, 260, 261, 262, 263, 264, 265
See application file for complete search history.

(56) References Cited

U.S. PATENT DOCUMENTS 5,555,102 A 9/1996 Dalton
6,252,679 B1 * 6/2001 Wang ..................... 358/1.9
6,356,363 B1 * 3/2002 Cooper et al. .............. 358/1.9
6,433,891 B1 8/2002 Yu et al.
6,493,112 B1 * 12/2002 Arce et al. ................ 358/3.19
6,747,758 B1 * 6/2004 Nishida .................... 358/1.9
2002/0163528 A1 11/2002 Cooper

FOREIGN PATENT DOCUMENTS

EP 0977424 2/2000
EP 1168820 1/2002

OTHER PUBLICATIONS

Lau, D.L., Arce,G. R., Gallagher, N.C., Digital color halftoning with generalized error diffusion and multichannel green-noise masks, IEEE Transactions on Image Pressing, vol. 9, No. 5, May 2000.*
Ulichney, Robert, Digital HalftoningThe MIT Press, Cambridge, Massachusetts, ISBN 0-262-21009-6, Fifth Printing, 1996.*

* cited by examiner

*Primary Examiner*—King Poon
*Assistant Examiner*—Steven Kau

(57) ABSTRACT

A method for generating a dither matrix for converting a gray scale image having N gray levels into a halftone image, which includes using a parametric filter to generate a dither halftone pattern for each gray level $G_i > G_t$, where $N>2$, $G_t$ represents a transition gray level, the lightest gray level is $G_0$, the darkest gray level is $G_{N-1}$, and $G_t \geq G_0$, the parametric filter based upon a desired spot profile function of the halftone image, and using the generated dither halftone pattern to generate the dither matrix.

38 Claims, 9 Drawing Sheets

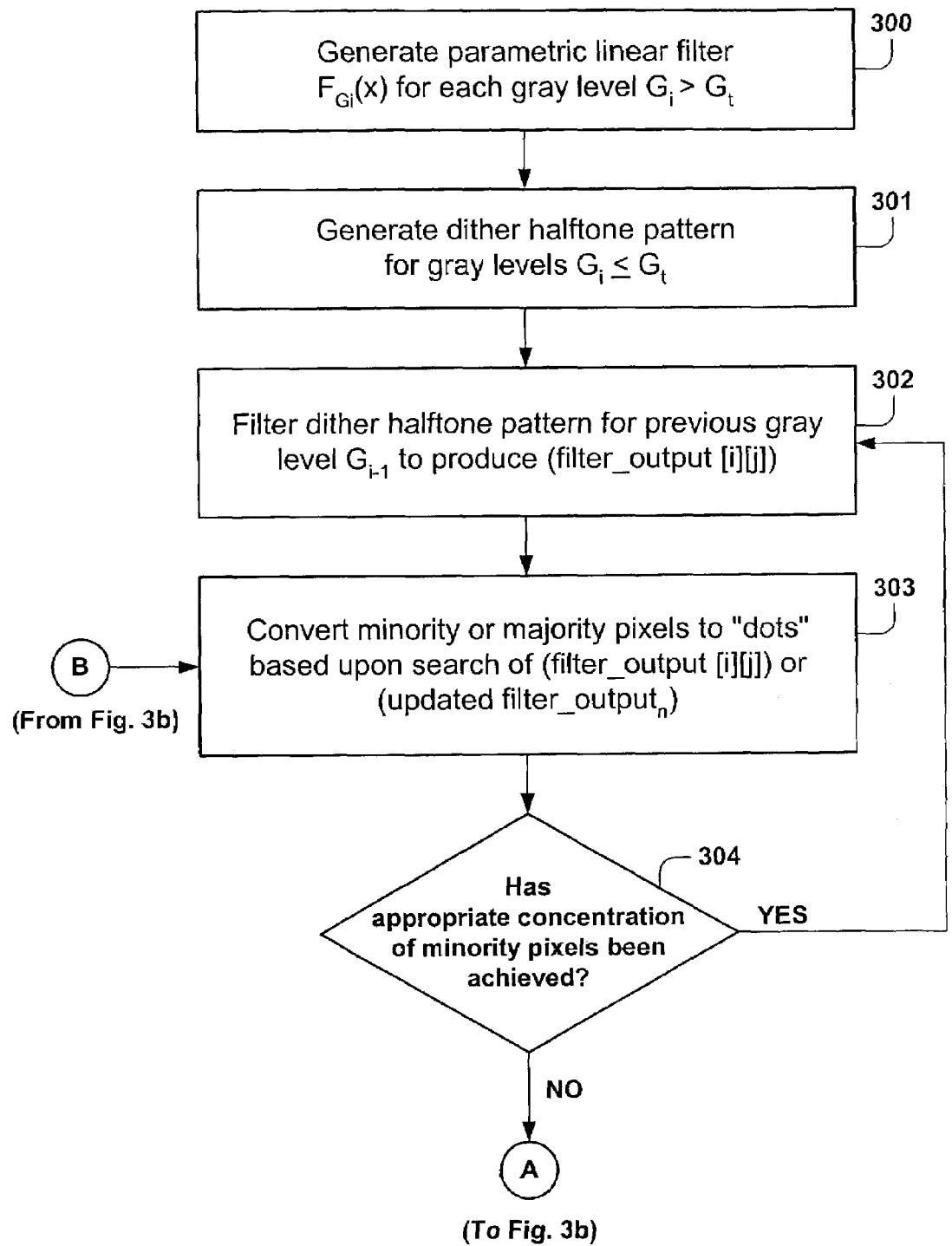

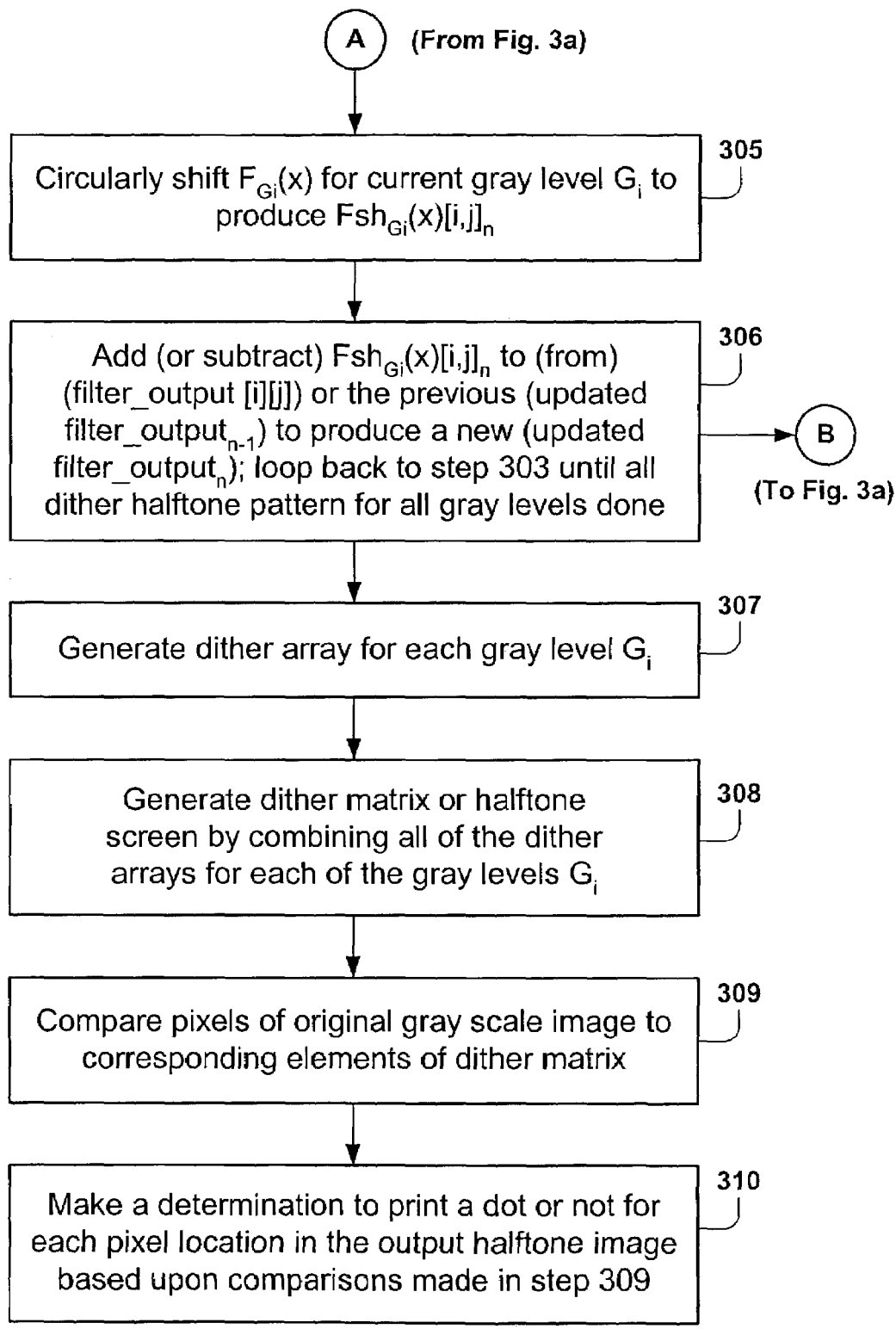

(To Fig. 6b)

DITHER MATRIX GENERATION

BACKGROUND

Halftone imaging, sometimes referred to simply as "halftoning," is a well-known technique for transforming a continuous tone or gray scale image (e.g., a photograph or a digital image) having picture elements or "pixels" that have tones whose values vary continuously or over a large number of discrete gray levels, into a halftone image having pixels that are either black (presence of a mark or "dot") or white (absence of a mark or "dot"). Although the absence of a black dot can be considered a white dot, for ease of discussion, the term "dot", as used herein, refers to the presence of a black dot. In general, the halftone image creates the illusion of continuous tone. In color printers, the illusion of continuous shades of color is produced by superimposing the halftones of the individual colorants used, e.g., cyan, magenta, yellow and black (CYMK).

Halftoning can be performed by modulating the size or amplitude of the dots, which is sometimes referred to as "amplitude modulation" or AM, or by modulating the spacing or frequency of the dots, which is sometimes referred to as "frequency modulation" or FM. A combination of AM and FM halftoning, sometimes referred to as "AM/FM halftoning," simultaneously modulates dot size and dot density. With AM halftoning, the viewer of the printed halftone image will perceive areas of the halftone image having larger dots to have a darker gray level than areas of the halftone image having smaller dots. With FM halftoning, the viewer of the printed halftone image will perceive areas of the halftone image having a greater density of dots to have a darker gray level than areas of the halftone image having a lesser density of dots. With AM/FM halftoning, the viewer of the printed halftone image will perceive areas of the halftone image having a greater density of and/or larger dots to have a darker gray level than areas of the halftone image having a lesser density of and/or smaller dots.

Another halftoning technique is to transform a gray scale image to a halftone image using a dither matrix or halftone screen. The dither matrix consists of a two-dimensional array of elements, each having a value v ranging from 0 to (z−1), where z represents the total number of gray levels within the gray scale range being used. For example, when using a gray scale range of 0 through 255, where 0 represents white and 255 represents black, $0 \leq v \leq 255$. The number of elements in the dither matrix can be smaller than or equal to the number of pixels in the gray scale image to be transformed. The dither matrix is mapped over the gray scale image. For a gray scale image that is larger than the dither matrix, the dither matrix is replicated or tiled to cover the entire gray scale image. Each pixel in the gray scale image is compared to a corresponding element in the halftone screen. If the gray scale image pixel has a larger or equal value, a dot is formed in the corresponding position of the halftone image, assuming an ascending gray level numbering convention is employed, i.e., where higher gray level numbers correspond to darker gray levels. Conversely, if a descending gray level numbering convention is employed, i.e., where higher gray level numbers correspond to lighter gray levels, then no dot is formed in the corresponding position of the halftone image if the gray scale image pixel has a larger value than the corresponding element of the halftone screen. When printing such a halftone image, the printing engine will print a dot for each position or location in the halftone image in which a dot has been formed.

It is desirable that the halftoning process produce a halftone image that is virtually indistinguishable from the gray scale image being reproduced. In order to achieve such a result, the gray level patterns in the halftone image should be as imperceptible as possible to the human eye. To this end, halftone screens have been designed to achieve a pseudo-random or stochastic distribution of dots over the halftone image. Such halftone screens are sometimes referred to as "stochastic screens."

Some imaging devices are incapable of stably or reliably producing dots beyond a certain horizontal dot resolution. For example, some laser printers operate in an enhanced resolution imaging mode, sometimes referred to as a High Definition Imaging (HDI) mode, in which the laser horizontal scan line of the normal resolution mode is subdivided into finer increments, whereby the laser print engine must produce dots during correspondingly shorter laser on/off cycles. In other words, each pixel of the halftone image produced by the laser printer in the enhanced resolution mode is subdivided into sub-pixels. For example, if the normal horizontal resolution mode of a laser printer is 600 dots per inch (dpi), and the enhanced horizontal resolution mode of that laser printer is 2,400 dpi, then each pixel of the halftone image produced by that laser printer in the enhanced horizontal resolution mode is subdivided into 4 sub-pixels, so that the laser on/off cycle in the enhanced horizontal resolution mode is ¼th the laser on/off cycle in the normal horizontal resolution mode. However, the laser printer engine may be incapable of stably or reliably printing isolated "sub-pixel dots" at that sub-pixel resolution, which results in perceptible visual anomalies or quantization noise in the resultant half-tone image produced by the laser printer. Such instability of the image forming device is referred to herein as "dot instability".

It is has been found desirable to force a certain level of dot clustering in a halftone image in order to minimize perceptible quantization noise in the halftone image attributable to dot instability of the image forming device. A halftone screen designed to produce a halftone image having a stochastic distribution and clustering of dots is sometimes referred to as a "clustered-dot stochastic halftone screen." Clustered-dot stochastic screen designs can be used to design high quality clustered-dot stochastic screens that are moiré and pattern free, and that are also less likely to show bands, even when printing halftone images with a laser printer or other printers that have printing engines that exhibit dot-to-dot interactions. Further, clustered-dot stochastic halftone screens can be used to produce a halftone image that exhibits halftone noise which is very similar to the grain noise in a photograph, whereby the halftone image better resembles a real photograph. The filter parameters can be adjusted in order to produce a stochastic patterning of dot clusters in the output halftone image which vary in both their size and in their spacing. For example, it may be desirable to produce halftone images with large clusters in printers with high dot-gain characteristics and small clusters in printers with low dot-gain characteristics.

However, it is desirable to generate a halftone screen that achieves a desired statistical distribution of dots ("spatial characteristics") in an output halftone image (e.g., with respect to average dot size and/or average inter-minority pixel distance), in a manner that minimizes the need for experimentation on the part of the screen designer in order to achieve this result. It would also be desirable to generate a color halftone screen having such attributes for color halftoning applications.

SUMMARY

The present invention encompasses, among other things, a method for generating a dither matrix for converting a gray scale image having N gray levels into a halftone image, which includes using a parametric filter to generate a dither halftone pattern for each gray level $G_i > G_t$, where $N > 2$, $G_t$ represents a transition gray level, the lightest gray level is $G_0$, the darkest gray level is $G_{N-1}$, and $G_i \geq G_0$, the parametric filter based upon a desired spot profile function of the halftone image, and using the generated dither halftone pattern to generate the dither matrix.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 3 is a flow chart diagram of a method for generating a monochrome dither matrix in accordance with an embodiment of the present invention;

DETAILED DESCRIPTION

Figure 1:
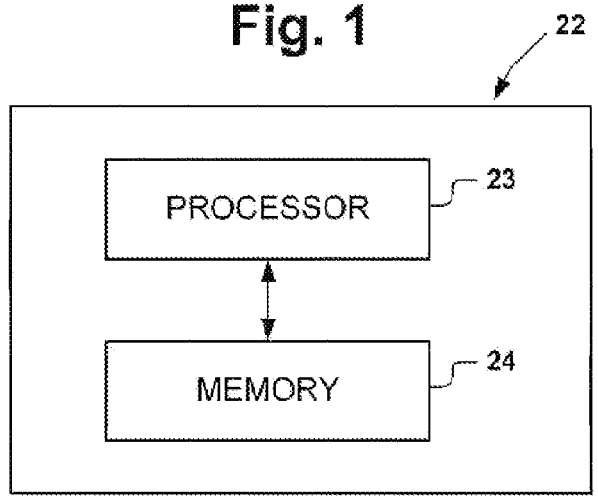
FIG. 1 is a functional block diagram of an exemplary laser printing system.

The present invention encompasses a method and system for forming an image. The method can be implemented in software, firmware, and/or hardware, as illustrated in FIG. 1. For example, the method can be implemented in software (executable code) that is installed or instantiated on the processor of a host computer and/or the processor of an image forming device. Alternatively, the method can be implemented in a dedicated or specially-programmed logic device, such as an ASIC (Application Specific Integrated Circuit) or microcontroller.

For purposes of illustration, the present invention is described in the context of a laser printer or laser printing system. However, it should be clearly understood that the present invention is not limited to this particular context or application, but rather, is broadly applicable to any image forming device or printing system application.

With reference now to FIG. 1, there can be seen a high-level functional block diagram of a system 22 according to the present invention, which can be used in an image forming or printing application. The system 22 includes a processor 23 and a memory 24, with the processor 22 being programmed to implement a method of the present invention.

An exemplary embodiment of the method implemented by the system 22 assumes that the gray scale image consists of pixels each having a gray level of between 0 (white) and 255 (black). However, it should be understood that the present invention is not limited to any particular gray level range. Further, in the following description, it is assumed that an ascending gray level numbering convention is used. However, it will be readily apparent to those having ordinary skill in the pertinent art that the present invention can be practiced using the inverse of the described logic, in the event that a descending gray level numbering convention is used instead. As used herein, the term "minority pixel" refers to a dot for all gray levels $G_i \leq 0.5 G_{max}$, and the term "majority pixel" refers to a dot for all gray levels $G_i > 0.5 G_{max}$, where $G_{max}$ represents the maximum gray level (e.g., 255=black) in the case where an ascending gray level numbering convention is used. Of course, in the event a descending gray level numbering convention is used, the term "minority pixel" refers to a "no dot" for all gray levels $G_i \leq 0.5 G_{max}$, and the term "majority pixel" refers to a "no dot" for all gray levels $G_i > 0.5 G_{max}$.

As used herein, the term "dither halftone pattern" refers to the pattern of "dots" and "no dots" (i.e., 1s and 0s) generated for each gray level. As used herein, the term "dither array" refers to the array of gray scale values generated for each gray level. As used herein, the term "dither matrix" refers to the combination or composite of the dither arrays for each respective gray level $G_i$. The dither matrix is used in generating the output halftone image.

In general, in accordance with the method of the present invention, a parametric filter is generated for each gray level above a transition gray level $G_t$, based upon the desired spot profile function or spatial halftone statistics for each respective gray level of the output halftone image to be produced. Suitable techniques for deriving and mathematically describing optimum halftone statistics for different applications and environments are disclosed in an article entitled "Digital color halftoning with generalized error diffusion and multi-channel green-noise masks", by D. Lau, G. Arce and N. Gallagher, published in *IEEE Transactions on Image Processing*, Vol. 9, pp 923-935, May 2000. However, it should be clearly understood that the present invention is not limited to any particular halftone statistics or spot profile function.

The parametric filter is preferably a linear filter that produces a desired halftone pattern for each gray level above a transition gray level $G_t$ (e.g., $G_t = 0.10 G_{max}$), with respect to the desired halftone statistics of the output halftone image, e.g., the desired spatial characteristics of the output halftone image, such as the desired radial and/or non-radial distribution of minority pixels at different average distances from each minority pixel.

Figure 1A:
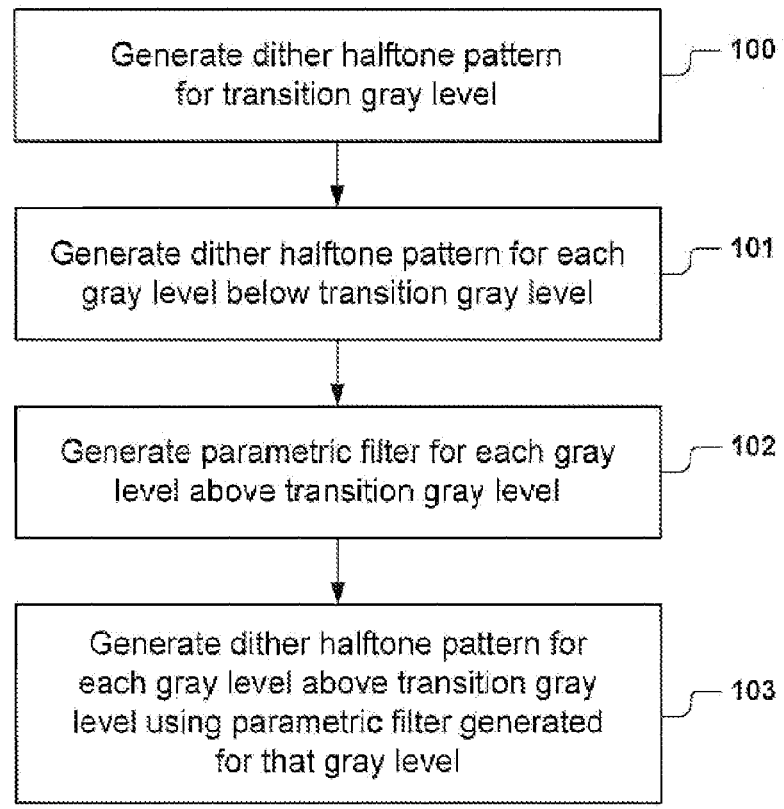
FIG. 1a illustrates a high-level description of a method according to the present invention.

With reference now to FIG. 1a, in step 100, in an exemplary embodiment, a dither halftone pattern for the transition gray level $G_t$ is first generated in any suitable manner, e.g., using any suitable filter, such as a Gaussian low-pass filter, or alternatively, using any other FM screen design method, such as the method described in an article entitled "FM screen design using the DBS algorithm", by J. Allebach and Q. Lin, published in *Proc. IEEE International Conf. on Image Processing*, Vol. I , pp. 549-552, September 1996.

Next, in step 101, a dither halftone pattern for each respective gray level below ("lighter than") the transition gray level $G_t$ is generated in any suitable manner, e.g., using any suitable filter, such as a Gaussian low-pass filter, or alternatively, using any other FM screen design method, such as described in the article entitled "FM screen design using the DBS algorithm", by J. Allebach and Q. Lin, published in *Proc. IEEE International Conf. on Image Processing*, Vol. I, pp. 549-552, September 1996.

Next, in step 102, a parametric filter for each gray level above ("darker than") the transition gray level $G_t$ is generated, based upon a desired spot profile function or spatial halftone statistics.

Next, in step 103, a parametric filter is used to generate a dither halftone pattern for each respective gray level above ("darker than") the transition gray level $G_t$. For example, a Gaussian low-pass filter can be used to generate the dither halftone pattern for each gray level until the pattern achieves a prescribed dot density, e.g., until the pattern becomes dense enough that the dots almost begin to touch, at which point a parametric filter can be used to take advantage of its superior dot growth and spatial modulation characteristics, e.g., to produce clusters of dots that can be reliably and stably produced by a given printer. However, the transition gray level $G_t$ can be selected to be the lightest gray level (e.g., 0), in which case, the parametric filter is used to generate the dither halftone pattern for all gray levels (e.g., 0-255).

Alternatively, a first parametric filter that does not produce dot clustering can be used to generate the dither halftone pattern for the transition gray level $G_t$ and all lighter gray levels, and a second parametric filter that does produce dot clustering can be used to generate the dither halftone pattern for all gray levels darker than the transition gray level $G_t$.

In any case, it should be appreciated that the particular methodology used in generating the dither halftone pattern for the transition gray level $G_t$ and all lighter gray levels is not limiting to the present invention, in its broadest sense. Also, the order in which the dither halftone patterns are generated is not limiting to the present invention, in its broadest sense. For example, although it is preferable that the dither halftone pattern for the transition gray level $G_t$ be generated first, alternatively, the dither halftone pattern for the lightest gray level can be generated first, with the dither halftone patterns for successively darker gray levels being generated thereafter.

In a presently contemplated preferred embodiment, the parametric filter has the general characteristics of a donut filter, i.e., peaks occurring away from the current pixel, in order to cause a stochastic clustering of dots in the dither halftone pattern for each respective gray level within the prescribed gray level range. In general, such stochastic clustered-dot halftone patterns are moiré and pattern free, and are also less likely to show bands. Further, such stochastic clustered-dot halftone patterns exhibit halftone noise very similar to that of the grain noise of a real photograph, superior tone reproduction characteristics, and more stable dots in printing engines with dot-to-dot interaction. In general, a Gaussian filter has a local maxima at its center, whereas the parametric filter has a local maxima at a location other than its center, and can have a local minima at its center, although these features are not limiting to the present invention, in its broadest aspects.

Figure 2:
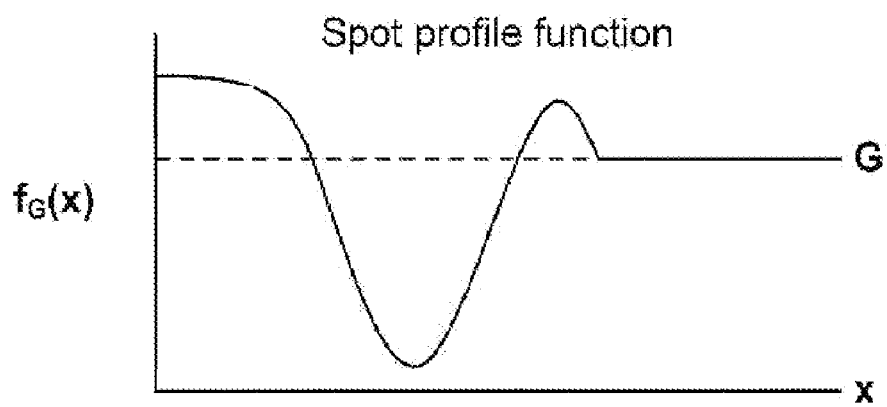
FIG. 2 is a graph illustrating an exemplary spot profile function that can be used in generating a parametric linear filter in accordance with an embodiment of the present invention.

With reference now to FIG. 2, there can be seen a graph illustrating an exemplary spot profile function $f_{Gi}(x)$ that defines desired spatial halftone statistics of a corresponding gray level $G_i$ of the output halftone image to be produced using the method of the present invention. The exemplary spot profile function $f_{Gi}(x)$ shown in FIG. 2 represents a desired radial distribution of minority pixels in the corresponding gray level $G_i$ of the output halftone image, where x is expressed in units of average distance between minority pixels X. In an exemplary embodiment, for all gray levels $G_i \leq G_t$, the average inter-minority pixel distance $X=1/\text{sq. rt.} (G_i/G_{max})$; for all gray levels $G_t < G_i < G_{max} - G_t$, the average inter-minority pixel distance X is held constant; and, for all gray levels $G_i \geq G_{max} - G_t$, the average inter-minority pixel distance $X=1/\text{sq. rt.} (1-G_i/G_{max})$. This exemplary embodiment simulates the idealized spatial halftone statistics of halftone images produced using a clustered-dot stochastic halftoning algorithm. Alternatively, the spatial halftone statistics of any other halftoning algorithm can be used to compute the spot profile functions used in practicing the present invention. For a more detailed understanding of spatial halftone statistics, reference can be made to the book entitled *Digital Halftoning*, by R. Ulichney, published by MIT Press, Cambridge, Mass. (1987).

The exemplary spot profile function $f_{Gi}(x)$ shown in FIG. 2 thus defines the desired shape, size, and distribution of dot clusters, or "spots," in the output halftone image, at gray level $G_i$. However, neither the halftone statistics nor the particular spot profile function employed are limiting to the present invention. For example, an alternative spot profile function that represents a desired non-radial (or radial and non-radial) distribution of minority (and/or majority) pixels can be used instead of the exemplary spot profile function $f_{Gi}(x)$ shown in FIG. 2.

With reference now to FIG. 3, there can be seen a flow chart diagram of a method for generating a monochrome dither matrix in accordance with an embodiment of the present invention. As previously discussed, a dither halftone pattern is generated for the transition gray level $G_t$, and for each gray level lighter than the transition gray level $G_t$, in any convenient manner. For example, if the gray level range is 0 to 255, then gray level 25 can be set to be the transition gray level $G_t$. Alternatively, the transition gray level $G_t$ can be set to be the lightest gray level, e.g., 0.

With continuing reference to FIG. 3, in step 300, a parametric linear filter $F_{Gi}(x)$ is generated for each gray level $G_i > G_t$, in accordance with the following equation (1):

$$F_{Gi}(x) = (1-\alpha)*(\log f_{Gi}(x)/\log f_{Gi}(0)) + \alpha e^{-x^2}, \quad (1)$$

where $\alpha \in [0,1]$, $\alpha$ is a parameter that represents a trade-off between uniform dot growth and optimum halftone statistics as defined by the spot profile function $f_{Gi}(x)$, and x represents units of average inter-minority pixel distance. The value of $\alpha$ can be selected to shape the impulse response of the parametric linear filter $F_{Gi}(x)$ as desired.

Figure 4:
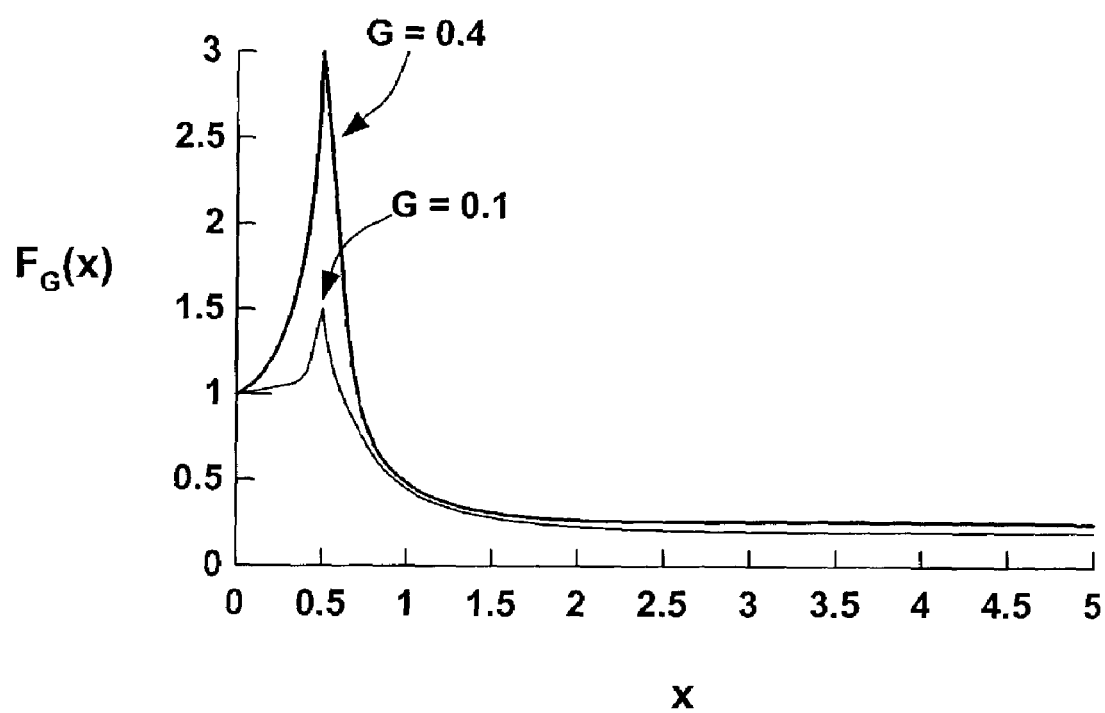
FIG. 4 is a graph depicting the impulse response of a parametric linear filter generated in accordance with an embodiment of the present invention, at each of two different gray levels.

FIG. 4 is a graph depicting the impulse response of a parametric linear filter created in accordance with an embodiment of the present invention, at each of two different gray levels, $G=0.1\ G_{max}$ and $G=0.4\ G_{max}$.

With reference again to FIG. 3, in step 301, the dither halftone pattern for all gray levels $G_i \leq G_t$ are generated, in any suitable manner. In an exemplary embodiment, the parametric linear filter $F_{Gi}(x)$ generated in accordance with equation (1) can be used to generate the dither halftone pattern for all gray levels $G_i \leq G_t$, and for all gray levels $G_i > G_t$, with the spot profile function $f_{Gi}(x)$ for all gray levels $G_i \leq G_t$ being designed to exhibit no dot clustering, and the spot profile function $f_{Gi}(x)$ for all gray levels $G_i > G_t$ being designed to exhibit dot clustering. Thus, the parametric linear filter used in generating the dither halftone pattern for all gray levels $G_i \leq G_t$ can be considered a first type of parametric linear filter, and the parametric linear filter used in generating the dither halftone pattern for all gray levels $G_i > G_t$ can be considered a second type of parametric linear filter. For example, a spot profile function $f_{Gi}(x)$ can be generated for all gray levels $G_i \leq G_t$ in accordance with the following equation (2):

$$f_{Gi}(x) = \delta, \text{ when } x \leq 0.5, \text{ and}$$

$$f_{Gi}(x) = G/[1+\delta-2(e^{(-10(x-0.5)^2)} - 0.5e^{(-5(x-0.5)^2)})], \text{ when } x > 0.5, \text{ where } \delta = 10^{-15} \text{ to avoid } \log(0). \quad (2)$$

A spot profile function $f_{Gi}(x)$ can be generated for all gray levels $G_i > G_t$ in accordance with the following equation (3):

$$f_{Gi}(x) = G[1 + \delta - 2(e^{(-10(x-0.5)^2)} - 0.5 e^{(-5(x-0.5)^2)})], \text{ where}$$
$$\delta = 10^{-15} \text{ to avoid log(0)}. \quad (3)$$

With continuing reference to FIG. 3, in step 302, the dither halftone pattern for the previous ("nearest lighter") gray level $G_{i-1}$ is filtered using the parametric linear filter $F_{Gi}(x)$ for gray level $G_i > G_t$, to produce (filter_output [i][j]). If the size of the dither matrix is less than the size of the original or source gray scale image to be halftoned, then the filtering is carried out using circular convolution.

In step 303, for all gray levels $G_i \leq 0.5\ G_{max}$, a search is performed to find the majority pixel where the (filter_output [i][j]) (or the (updated filter_output$_n$) obtained during the previous iteration of step 306) is minimum; for all gray levels $G_i > 0.5\ G_{max}$, a search is performed to find the minority pixel where the (filter_output [i][j]) (or the (updated filter_output$_n$) obtained during the previous iteration of step 306) is maximum. For all gray levels $G_i \leq 0.5\ G_{max}$, the minority pixels are dots, and for all gray levels $> 0.5\ G_{max}$, the majority pixels are dots. For gray levels $G_i \leq 0.5\ G_{max}$, the identified majority pixel is converted to a minority pixel. For gray levels $G_i > 0.5\ G_{max}$, the identified minority pixel is converted to a majority pixel. In each case, the result of the "conversion" process is the addition of a "dot."

In step 304, a decision is made as to whether the appropriate concentration of minority pixels (i.e., the appropriate ratio of minority pixels/total pixels) has been achieved by virtue of the last conversion of a majority pixel to a minority pixel, or vice versa, in step 303. In general, the appropriate ratio of minority pixels/total pixels for a each gray level $G_i \leq 0.5\ G_{max}$ is $G_i / G_{max}$, and the appropriate ratio of minority pixels/total pixels for each gray level $G_i > 0.5\ G_{max}$ is $1 - (G_i / G_{max})$. For example, the appropriate ratio of minority pixels/total pixels for gray level $0.1\ G_{max}$ is 0.1, and the appropriate ratio of minority pixels/total pixels for gray level $0.6\ G_{max}$ is $(1-0.6) = 0.4$.

If the decision made in step 304 is "no," then processing proceeds to step 305.

In step 305, the parametric linear filter $F_{Gi}(x)$ for the current gray level $G_i$ is shifted, to produce a circularly shifted version $Fsh_{Gi}[i,j]_n$ of the parametric linear filter $F_{Gi}(x)$, where $Fsh_{Gi}[i,j]$ is computed in accordance with the following equation (4):

$$Fsh_{Gi}[i,j]_n = F_{Gi}[\text{mod}((x0-i), Xsize)][\text{mod}((y0)-j), Ysize)], \quad (4)$$

where mod represents the positive integer modulo operation; x0, y0 represents the position of the last-added dot, $Fsh_{Gi}[i,j]$ represents $F_{Gi}(x)$ in rectangular coordinates, and n represents the current iteration of steps 303-306 for generating a dither halftone pattern for a given gray level $G_i$.

In step 306, the circularly shifted version $Fsh_{Gi}[i,j]_n$ of the parametric linear filter $F_{Gi}(x)$ obtained in step 305 is added to (or subtracted from) (filter_output [i][j]) or the previous updated filter output (updated filter_output$_{n-1}$), to thereby obtain a new updated filter output (updated filter_output$_n$), where n represents the current iteration of steps 303-306 for generating a dither halftone pattern for a given gray level $G_i$. More particularly, for the case where the current gray level $G_i \leq 0.5\ G_{max}$, the (updated filter_output$_n$) is generated in accordance with equation (5) below:

$$(\text{filter\_output } [i][j]) + Fsh_{Gi}[i,j]_n = (\text{updated filter\_output}_n), \text{ or}$$

$$(\text{updated filter\_output}_{n-1}) + Fsh_{Gi}[i,j]_n = (\text{updated filter\_output}_n). \quad (5)$$

For the case where the current gray level $G_i > 0.5\ G_{max}$, the (updated filter_output$_n$) is generated in accordance with equation (6) below:

$$(\text{filter\_output } [i][j]) - Fsh_{Gi}[i,j]_n = (\text{updated filter\_output}_n), \text{ or}$$

$$(\text{updated filter\_output}_{n-1}) - Fsh_{Gi}[i,j]_n = (\text{updated filter\_output}_n). \quad (6)$$

The method then loops back to step 303. Steps 303-306 are repeated for the current gray level $G_i$ until the dither halftone pattern for the current gray level $G_i$ is completed, i.e., until the decision at step 304 is "yes."

If the decision made in step 304 is "yes," then steps 302-306 are repeated for the next higher gray level $G_{i+1}$, and thereafter, for each successively higher gray level, until a dither halftone pattern has been generated for all gray levels.

To summarize, in steps 302-306, a dither halftone pattern is generated for each gray level $G_i > G_t$ by replacing zeroes ("0s") in the dither halftone pattern for the next lower (lighter) gray level with ones ("1s"), in essence, "adding dots" to the dither halftone pattern for the next lower gray level, using a parametric linear filter that produces dot clustering. Otherwise stated, a dither halftone pattern is generated for each gray level $G_i$ by using the existing "1s" or "dots" of the dither halftone pattern for the next lighter gray level $G_{i-1}$ as seeds where clustered dots are grown. Thus, the dither halftone patterns corresponding to successively darker gray levels can be viewed as successively darker, clustered-dot halftone patterns.

Next, in step 307, a dither array is generated for each gray level $G_i$ by assigning a gray scale value to each element of the dither halftone pattern that was generated for that respective gray level $G_i$. More particularly, for a given gray level $G_i$, each dot ("1") in the dither halftone pattern for that given gray level $G_i$ that was added during the generation of the dither halftone pattern for that given gray level $G_i$, is assigned the value i. For example, the elements of the dither array for gray level 187 corresponding to each dot that was added during the generation of the dither halftone pattern for gray level 187 will be assigned a value of 187.

Next, in step 308, the dither matrix to be used in producing the output halftone image is generated by superimposing or combining all of the dither arrays for each of the gray levels $G_i$. The resultant dither matrix can be considered a composite of the dither arrays for each respective gray level $G_i$.

Next, in step 309, the dither matrix is mapped to the original gray scale image to be halftoned, and an ith pixel in the gray scale image is compared to a corresponding element in the dither matrix, where i=1 to N, and N represents the total number of pixels in the gray scale image.

In step 310, based upon the comparison made in step 309, a determination is made as to whether or not a dot should be formed in the corresponding pixel location of the output halftone image. In one embodiment, a dot is formed in a pixel location of the output halftone image if the gray scale value of the corresponding pixel of the original gray scale image is $\geq$ the gray scale value of the corresponding element of the dither matrix; otherwise, no dot is formed at that pixel location in the output halftone image.

The method then loops back to step 309. Steps 309 and 310 are repeated until the output halftone image is completely formed.

Figure 5:
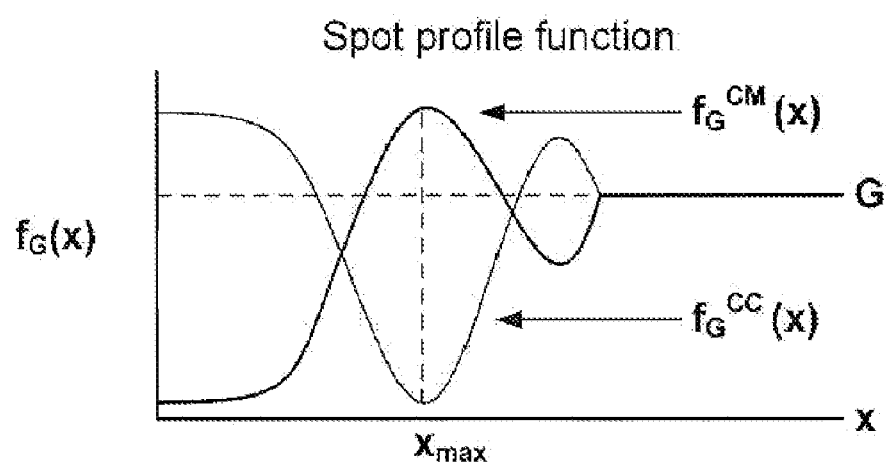
FIG. 5 is a graph illustrating exemplary spot profile functions that can be used in generating a parametric linear filter that can be used to generate a joint CM dither matrix in accordance with an embodiment of the present invention.

With reference now to FIGS. 5 and 6, the present invention can also be used to jointly design any number of colorant dither matrices for transforming a color image to a color halftone image, by generating a matrix-valued parametric linear filter (or, equivalently, a set of parametric linear filters), and then using that filter (set of filters) to generate a colorant dither matrix for any two or more colorants of the color halftone image, incorporating any desired constraints that apply to color image processing, e.g., a constraint that minimizes or prohibits the superposition of both cyan and magenta in the same pixel location of the output color halftone image. However, it should be appreciated that rather than using a matrix-valued filter (or set of filters) to jointly design a colorant dither matrix for different colorants, an individual parametric filter could instead be used to separately design independent colorant dither matrices.

More particularly, with reference now to FIG. 5, there can be seen a graph illustrating an exemplary colorant spot profile function $f_{Gi}^{CC}(x)$ that defines desired spatial halftone statistics of the cyan colorant of a corresponding gray level $G_i$ of the output color halftone image, without respect to any other colorant; and, an exemplary colorant spot profile function $f_{Gi}^{CM}(x)$ that defines desired spatial halftone statistics of the magenta colorant of a corresponding gray level $G_i$ of the output color halftone image, with respect to the cyan colorant. The exemplary colorant spot profile functions $f_{Gi}^{CM}(x)$ and $f_{Gi}^{CC}(x)$ shown in FIG. 5 represent a desired radial distribution of minority cyan colorant pixels, for the corresponding gray level $G_i$ of the output color halftone image, where x is expressed in units of average distance between the minority colorant pixels X, as measured with reference to a 0 axis or origin point that is a cyan minority pixel. The exemplary colorant spot profile functions $f_{Gi}^{CM}(x)$ and $f_{Gi}^{CC}(x)$ shown in FIG. 5 thus define the desired shape, size, and distribution of dot clusters, or "spots," of the cyan colorant, and of the magenta colorant with respect to the cyan colorant, respectively, in the output color halftone image, at gray level $G_i$.

Colorant spot profile functions $f_{Gi}^{MM}(x)$ and $f_{Gi}^{MC}(x)$ are used to define desired spatial halftone statistics of the magenta colorant of a corresponding gray level $G_i$ of the output color halftone image, without respect to any other colorant, and of the cyan colorant with respect to the magenta colorant, respectively. In the exemplary embodiment, the colorant spot profile functions $f_{Gi}^{CC}(x)$ and $f_{Gi}^{MM}(x)$, and the colorant spot profile functions $f_{Gi}^{CM}(x)$ and $f_{Gi}^{MC}(x)$ are assumed to be the same, for sake of convenience and simplicity, except that the origin point for the colorant spot profile functions $f_{Gi}^{MM}(x)$ and $f_{Gi}^{MC}(x)$ is a magenta minority pixel, rather than a cyan minority pixel. Thus, the colorant spot profile functions $f_{Gi}^{MC}(x)$ and $f_{Gi}^{MM}(x)$ are not separately depicted in the drawings. However, the present invention is not limited to this embodiment. Rather, the colorant spot profile functions $f_{Gi}^{CC}(x)$ and $f_{Gi}^{MM}(x)$, and the colorant spot profile functions $f_{Gi}^{CM}(x)$ and $f_{Gi}^{MC}(x)$ can be different, e.g., if an assymetrical distribution of cyan and magenta colorants is desired.

In general, neither the particular halftone statistics nor the particular colorant spot profile functions employed are limiting to the present invention. For example, alternative colorant spot profile functions that represent a desired non-radial (or radial and non-radial) distribution of minority (and/or majority) pixels can be used instead of the exemplary colorant spot profile functions shown in FIG. 5.

Further, although the exemplary embodiment described below generates colorant dither matrices for only two colorants (cyan (C) and magenta (M)) used in forming the output color halftone image, it should be clearly understood that the present invention can be used to generate colorant dither matrices for any one or more colorants, in any desired color space (e.g., CMYK or RGB). As will become readily apparent, the cyan and magenta colorant dither matrices generated using the method of the exemplary embodiment can alternatively be considered to constitute a joint C, M colorant dither matrix with each element thereof having a vector value [k, l], where k represents the cyan (C) value and l representes the magenta (M) value for a given element, and where k and l can be either "0" or "1."

In an exemplary embodiment, a dither colorant halftone pattern for the transition gray level $G_t$ is first generated in any suitable manner, e.g., in the manner described in "Color FM screen design using the DBS algorithm", Color Imaging: Device-Iindependent Color, by Q. Lin and J. Allebach, published in *Color Hardcopy, and Graphic Arts-III*, Vol. 3300, pp 353-361, 1998; or alternatively, using any other convenient colorant halftone screen design method.

Next, a dither colorant halftone pattern for each respective gray level below ("lighter than") the transition gray level $G_t$ is generated in any suitable manner, e.g., in the manner described in "Color FM screen design using the DBS algorithm", Color Imaging: Device-Iindependent Color, by Q. Lin and J. Allebach, published in *Color Hardcopy*, and *Graphic Arts-III*, Vol. 3300, pp 353-361, 1998; or alternatively, using any other suitable colorant halftone screen design method.

Next, a set of parametric filters are used to generate the cyan and magenta dither colorant halftone patterns for each respective gray level above ("darker than") the transition gray level $G_t$. However, the transition gray level $G_t$ can be selected to be the lightest gray level (e.g., 0), in which case, the set of parametric filters are used to generate the cyan and magenta dither colorant halftone patterns for all gray levels (e.g., 0-255).

Alternatively, a first type of matrix-valued parametric filter (or set of parametric filters) that does not produce dot clustering can be used to generate the cyan and magenta dither colorant halftone patterns for the transition gray level $G_t$ and all lighter gray levels, and a second type of matrix-valued parametric filter (or set of parametric filters) that does produce dot clustering can be used to generate the cyan and magenta dither colorant halftone patterns for all gray levels darker than the transition gray level $G_t$.

In any case, it should be appreciated that the particular methodology used in generating the dither colorant halftone patterns for the transition gray level $G_t$ and all lighter gray levels is not limiting to the present invention, in its broadest sense. Also, the order in which the dither colorant halftone patterns are generated is not limiting to the present invention, in its broadest sense. For example, although it is preferable that the dither colorant halftone pattern for the transition gray level $G_t$ be generated first, alternatively, the dither colorant halftone pattern for the lightest gray level can be generated first, with the dither colorant halftone patterns for successively darker gray levels being generated thereafter.

Figure 6A:
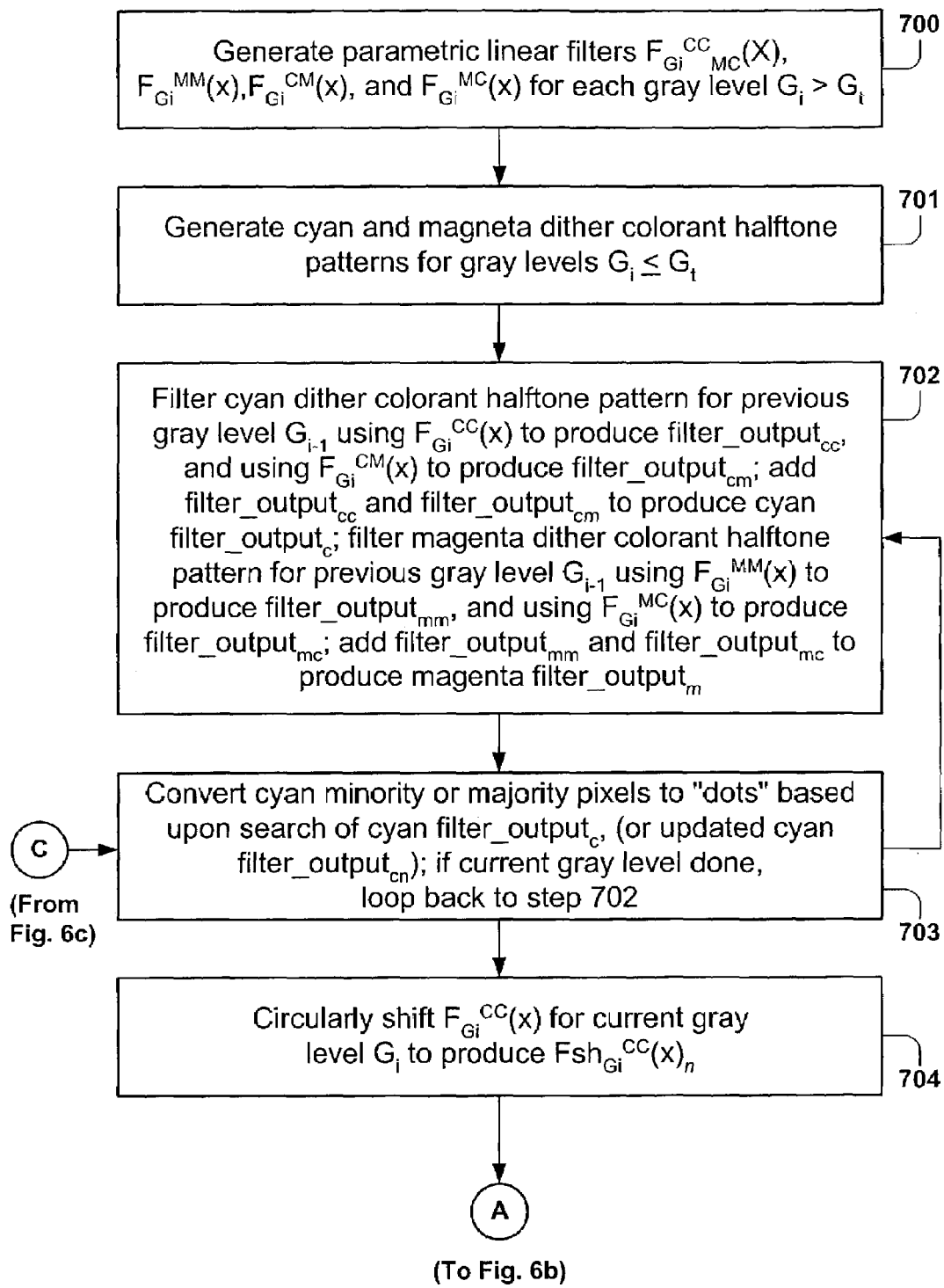
FIGS. 6a-6c are flow chart diagrams of a method for generating a joint CM dither matrix in accordance with an embodiment of the present invention.
Figure 6B:
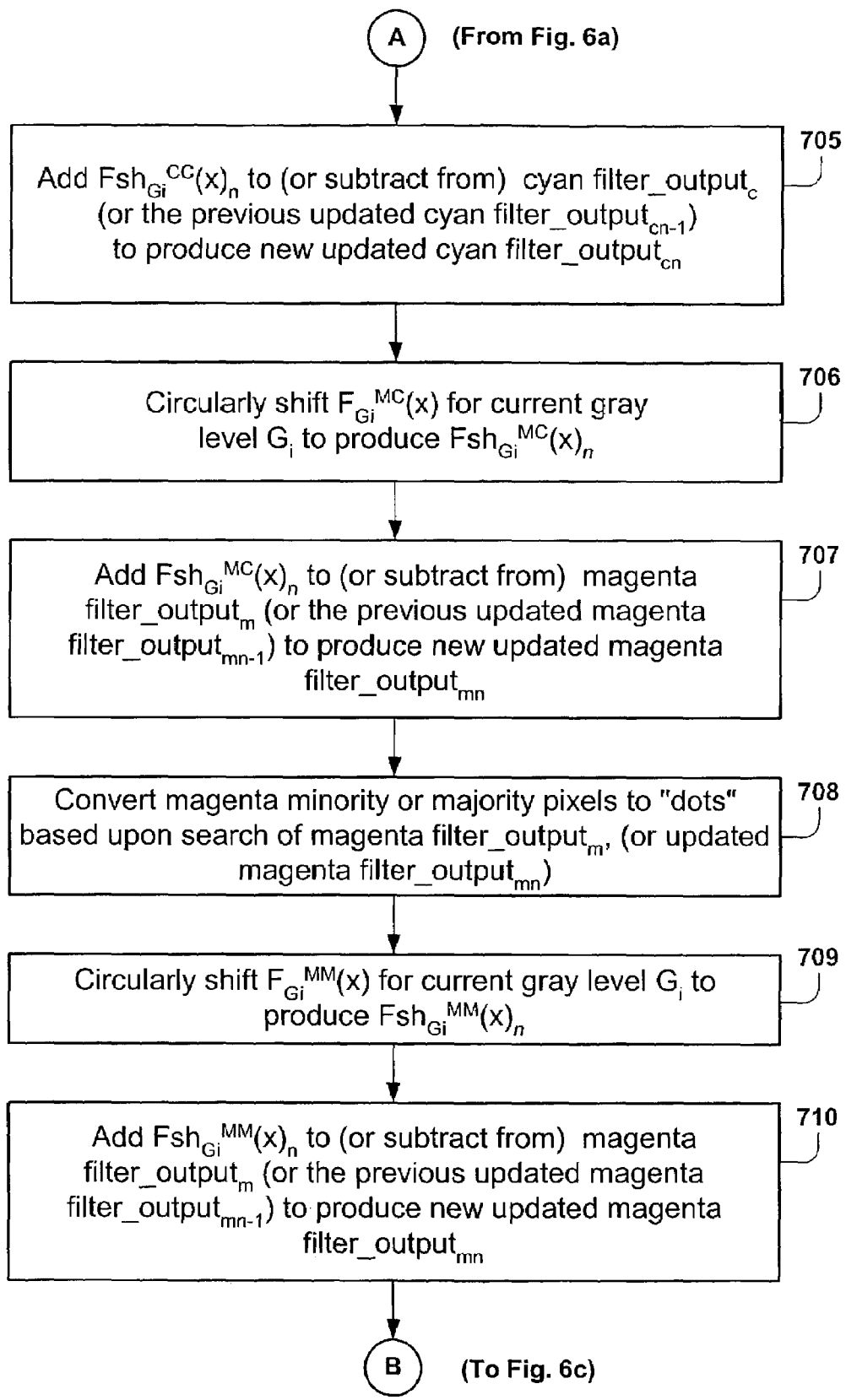
Figure 6C:
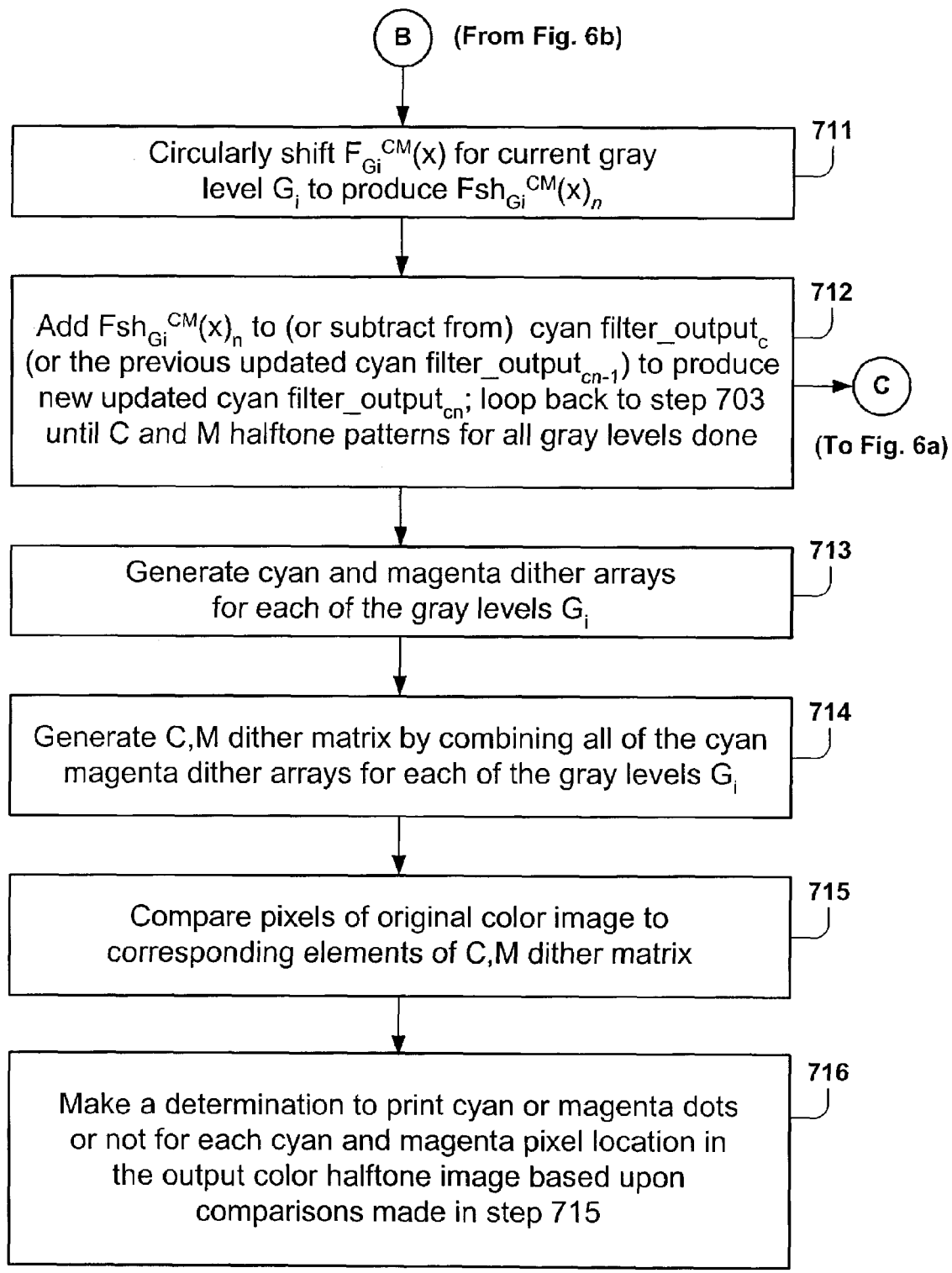
Figure 7:
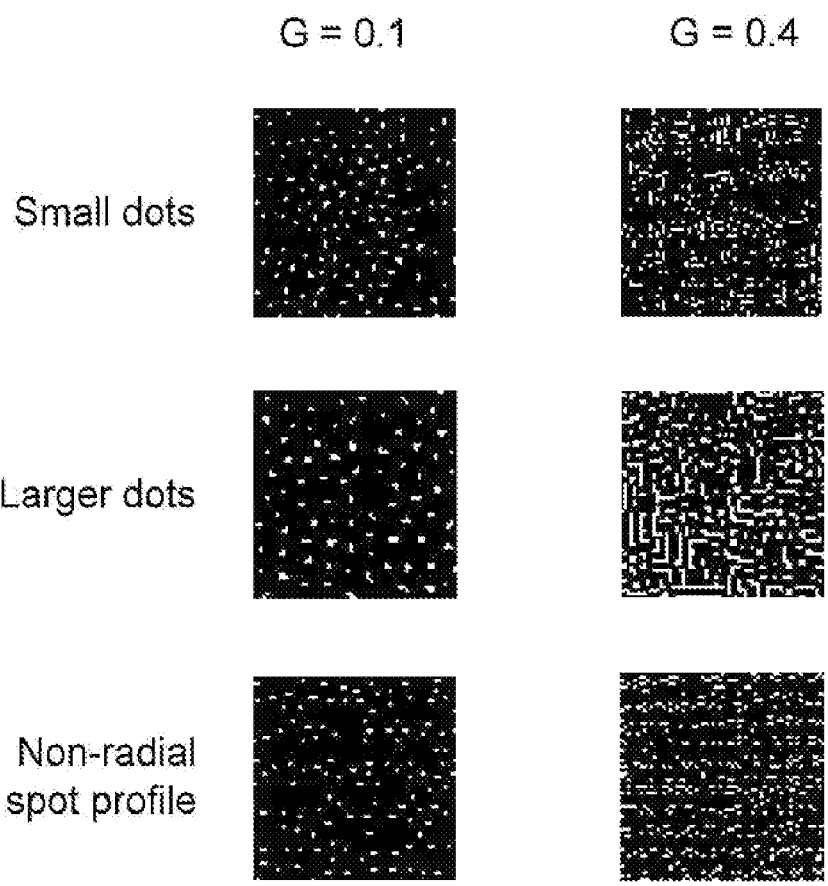
FIG. 7 illustrates results for different gray levels G and dot sizes.

With reference now to FIGS. 6a-6c, there can be seen a flow chart diagram of a method for jointly designing and generating cyan and magenta color dither matrices, in accordance with an exemplary embodiment of the present invention. In step 700, in the exemplary embodiment, a parametric linear filter $F_{Gi}^{CC}(x)$ is generated, for each gray level $G_i > G_t$, in accordance with the following equation (7):

$$F_{Gi}^{CC}(x) = (1-\alpha)*(\log f_{Gi}^{CC}(x)/\log f_{Gi}^{CC}(0)) + \alpha e^{-x^2}, \quad (7)$$

where $\alpha \in [0,1]$, $\alpha$ is a parameter that represents a trade-off between uniform dot growth and optimum halftone statistics as defined by the colorant spot profile function $f_{Gi}^{CC}(x)$, and x is expressed in units of average inter-minority colorant pixel distance X. The value of $\alpha$ can be selected to shape the impulse response of the parametric linear filter $F_{Gi}^{CC}(x)$ as desired.

Also, in the exemplary embodiment, a parametric linear filter $F_{Gi}^{MM}(x)$ is generated, for each gray level $G_i > G_t$, in accordance with the following equation (8):

$$F_{Gi}^{MM}(x) = (1-\alpha) * (\log f_{Gi}^{MM}(x)/\log f_{Gi}^{MM}(0)) + \alpha e^{-x^2}, \quad (8)$$

where $\alpha \in [0,1]$, $\alpha$ is a parameter that represents a trade-off between uniform dot growth and optimum halftone statistics as defined by the colorant spot profile function $f_{Gi}^{MM}(x)$, and x represents units of average inter-minority colorant pixel distance X. The value of $\alpha$ can be selected to shape the impulse response of the parametric linear filter $F_{Gi}^{MM}(x)$ as desired.

Further, in step 700, in the exemplary embodiment, a parametric linear filter $F_{Gi}^{CM}(x)$ is generated, for each gray level $G_i > G_t$, in accordance with the following equation (9):

$$F_{Gi}^{CM}(x) = (\log f_{Gi}^{CM}(x)/\log f_{Gi}^{CM}(x_{max})) \times \beta, \quad (9)$$

where $x_{max}$ represents the value of x at which CM is maximum, where $\beta$ is a weighting factor that weights the joint statistics of cyan and magenta relative to the statistics of cyan alone, and where $0 \leq \beta \leq 1$.

Additionally, in step 700, in the exemplary embodiment, a parametric linear filter $F_{Gi}^{MC}(x)$ is generated, for each gray level $G_i > G_t$, in accordance with the following equation (10):

$$F_{Gi}^{MC}(x) = (\log f_{Gi}^{MC}(x)/\log f_{Gi}^{MC}(x_{max})), \quad (10)$$

where $x_{max}$ represents the value of x at which MC is maximum.

However, it should be appreciated that in the case where the colorant spot profile functions $f_{Gi}^{CC}(x)$ and $f_{Gi}^{MM}(x)$, and the colorant spot profile functions $f_{Gi}^{CM}(x)$ and $f_{Gi}^{MC}(x)$ are assumed to be the same, it is not necessary to generate separate parametric linear filters $F_{Gi}^{MM}(x)$ and $F_{Gi}^{CC}(x)$, or separate parametric linear filters $F_{Gi}^{MC}(x)$ and $F_{Gi}^{CM}(x)$, since, in that case, $F_{Gi}^{MM}(x) = F_{Gi}^{CC}(x)$, and $F_{Gi}^{MC}(x) = F_{Gi}^{CM}(x)$.

With continuing reference to FIG. 6, in step 701, cyan and magenta dither colorant halftone patterns, for all gray levels $G_i \leq G_t$, are generated, in any convenient manner. For example, if the gray level range is 0 to 255, then gray level 25 can be set to be the transition gray level $G_t$. Alternatively, the transition gray level $G_t$ can be set to be the lightest gray level, e.g., 0.

Cyan and magenta colorant halftone patterns are generated in steps 702-713, as described below, for each gray level $G_i > G_t$.

In step 702, the cyan dither colorant halftone pattern for the previous ("nearest ligher") gray level $G_{i-1}$ is filtered using the parametric linear filter $F_{Gi}^{CC}(x)$, to thereby produce a filter_output$_{cc}$. Next, the magenta dither colorant halftone pattern for the previous ("nearest ligher") gray level $G_{i-1}$ is filtered using the parametric linear filter $F_{Gi}^{CM}(x)$, to thereby produce a filter_output$_{cm}$. The filter_Output$_{cc}$ and the filter_output$_{cm}$ are added together, to thereby produce the cyan filter_output$_c$. Additionally, the magenta dither colorant halftone pattern for the previous ("nearest ligher") gray level $G_{i-1}$ is filtered using the parametric linear filter $F_{Gi}^{MM}(x)$, to thereby produce a filter_output$_{mm}$. Next, the magenta dither colorant halftone pattern for the previous ("nearest ligher") gray level $G_{i-1}$ is filtered using the parametric linear filter $F_{Gi}^{MC}(x)$, to thereby produce a filter_output$_{mc}$. The filter_output$_{mm}$ and the filter_output$_{mc}$ are added together, to thereby produce the magenta filter_output$_m$. If the size of the dither matrix is less than the size of the original or source color image to be halftoned, then the filtering is carried out using circular convolution.

In step 703, for all gray levels $G_i \leq 0.5 \, G_{max}$, a search is performed to find the majority cyan pixel where the cyan filter output$_c$ (or the updated cyan filter_output$_{cn}$ obtained during the previous iteration of step 705) is minimum; for all gray levels $G_i > 0.5 \, G_{max}$, a search is performed to find the minority cyan pixel where the cyan filter_output$_c$ (or the updated cyan filter_output$_{cn}$ obtained during the previous iteration of step 705) is maximum. For all gray levels $G_i \leq 0.5 \, G_{max}$, the minority pixels are dots, and for all gray levels $> 0.5 \, G_{max}$, the majority pixels are dots. For gray levels $G_i \leq 0.5 \, G_{max}$, the identified majority pixel is converted to a minority pixel. For gray levels $G_i > 0.5 \, G_{max}$, the identified minority pixel is converted to a majority pixel. In each case, the result of the "conversion" process is the addition of a "dot."

In step 704, the parametric linear filter $F_{Gi}^{CC}(x)$ for the current gray level $G_i$ is circularly shifted, to thereby produce a circularly shifted version $Fsh_{Gi}^{CC}(x)_n$ of the parametric linear filter $F_{Gi}^{CC}(x)$ for the current gray level $G_i$, where n represents the current iteration of steps 703-712 for the current gray level $G_i$.

In step 705, the circularly shifted version $Fsh_{Gi}^{CC}(x)_n$ of the parametric linear filter $F_{Gi}^{CC}(x)$ obtained in step 704 is added to (or subtracted from) the cyan filter_output$_c$ (or the updated cyan filter_output$_{cn-1}$ obtained during the previous iteration of step 705), to thereby obtain a new updated cyan filter_output$_{cn}$.

In step 706, the parametric linear filter $F_{Gi}^{MC}(x)$ for the current gray level $G_i$ is circularly shifted, to thereby produce a circularly shifted version $Fsh_{Gi}^{MC}(x)_n$ of the parametric linear filter $F_{Gi}^{MC}(x)$ for the current gray level $G_i$.

In step 707, circularly shifted version $Fsh_{Gi}^{MC}(x)_n$ of the parametric linear filter $F_{Gi}^{MC}(x)$ obtained in step 706 is added to (or subtracted from) the magenta filter_output$_m$ (or the updated magenta filter_output$_{mn-1}$ obtained during the previous iteration of step 710), to thereby obtain a new updated magenta filter_output$_{mn}$.

In step 708, for all gray levels $G_i \leq 0.5 \, G_{max}$, a search is performed to find the majority magenta pixel output$_m$ (or the updated magenta filter_output$_{mn}$ obtained during the previous iteration of step 710) is minimum; for all gray levels $G_i > 0.5 \, G_{max}$, a search is performed to find the minority magenta pixel where the magenta filter_output$_m$ (or the updated magenta filter_output$_{mn}$ obtained during the previous iteration of step 710) is maximum.

In step 709, the parametric linear filter $F_{Gi}^{MM}(x)$ for the current gray level $G_i$ is circularly shifted, to thereby produce a circularly shifted version $Fsh_{Gi}^{MM}(x)_n$ of the parametric linear filter $F_{Gi}^{MM}(x)$ for the current gray level $G_i$.

In step 710, the circularly shifted version $Fsh_{Gi}^{MM}(x)_n$ of the parametric linear filter $F_{Gi}^{MM}(x)$ obtained in step 709 is added to (or subtracted from) the magenta filter output$_m$ (or the updated magenta filter_output$_{mn-1}$ obtained during the previous iteration of step 710), to thereby obtain a new updated magenta filter_output$_{mn}$.

In step 711, the parametric linear filter $F_{Gi}^{CM}(x)$ for the current gray level $G_i$ is circularly shifted, to thereby produce a circularly shifted version $Fsh_{Gi}^{CM}(x)_n$ of the parametric linear filter $F_{Gi}^{CM}(x)$ for the current gray level $G_i$.

In step 712, circularly shifted version $Fsh_{Gi}^{CM}(x)_n$ of the parametric linear filter $F_{Gi}^{CM}(x)$ obtained in step 706 is added to (or subtracted from) the cyan filter_output$_{cd}$ (or the updated cyan filter_output$_{cn-1}$ obtained during the previous iteration of step 705), to thereby obtain a new updated cyan filter_output$_{cn}$.

The method then loops back to step 703. Steps 703-712 are repeated for the current gray level $G_i$, until the cyan and magenta dither colorant halftone patterns for the current gray level $G_i$ are completed.

Steps 702-712 are then repeated for the next higher gray level $G_{i+1}$, and thereafter, for each successively higher gray level, until cyan and magenta dither colorant halftone patterns have been generated for all gray levels.

To summarize, in steps 702-712, cyan and magenta dither colorant halftone patterns are generated for each gray level $G_i > G_t$ by replacing zeroes ("0s") in the dither colorant halftone pattern for the next lower (lighter) gray level with ones ("1s"), in essence, "adding dots" to the dither colorant halftone pattern for the next lower gray level. Otherwise stated, a dither colorant halftone pattern for both the cyan and magenta colorants is generated for each gray level $G_i$ by using the existing "1s" or "dots" of the dither colorant halftone pattern for the cyan and magenta colorants, for the next lighter gray level $G_{i-1}$, as seeds where clustered dots are grown. Thus, the dither colorant halftone patterns corresponding to successively darker gray levels can be viewed as successively darker, clustered-dot colorant halftone patterns.

Next, in step 713, a cyan dither array is generated for each gray level $G_i$ by assigning a gray scale value to each element of the cyan dither colorant halftone pattern that was generated for that respective gray level $G_i$. More particularly, for a given gray level $G_i$, each dot ("1") in the cyan dither colorant halftone pattern, that was added during the generation of the cyan dither colorant halftone pattern for that given gray level $G_i$, is assigned the value i. For example, the values of the elements of the cyan dither array for gray level 187 corresponding to each cyan dot that was added during the generation of the cyan dither colorant halftone pattern for gray level 187 will be assigned a value of 187. Similarly, a magenta dither array is generated for each gray level $G_i$ by assigning a gray scale value to each element of the magenta dither colorant halftone pattern that was generated for that respective gray level $G_i$. More particularly, for a given gray level $G_i$, each dot ("1") in the magenta dither colorant halftone pattern, that was added during the generation of the magenta dither colorant halftone pattern for that given gray level $G_i$, is assigned the value i. For example, the values of the elements of the magenta dither array for gray level 233 corresponding to each magenta dot that was added during the generation of the magenta dither colorant halftone pattern for gray level 233 will be assigned a value of 233.

Next, in step 714, the cyan dither matrix to be used in producing the output color halftone image is generated by superimposing or combining all of the cyan dither arrays for each of the gray levels $G_i$. The resultant cyan dither matrix can be considered a composite of the cyan dither arrays for each respective gray level $G_i$. Similarly, the magenta dither matrix to be used in producing the output color halftone image is generated by superimposing or combining all of the magenta dither arrays for each of the gray levels $G_i$. The resultant magenta dither matrix can be considered a composite of the magenta dither arrays for each respective gray level $G_i$. The cyan and magenta matrices can together be considered to constitute a "joint C, M dither matrix" comprised of elements each having a vector value [k, l], where k represents the cyan (C)value and l representes the magenta (M) value for a given element, and where k and l can be either "0" or "1."

Next, in step 715, the joint C, M dither matrix is mapped to the original color image to be halftoned, and the cyan and magenta values of an ith pixel in the original color image are compared to the cyan and magenta values, respectively, of a corresponding vector-valued element in the joint C, M dither matrix, where i=1 to N, and N represents the total number of pixels in the color image.

In step 716, based upon the comparison made in step 715, a determination is made as to whether or not a cyan dot should be formed in the corresponding cyan pixel location of the output color halftone image, and a determination is made as to whether or not a magenta dot should be formed in the corresponding magenta pixel location of the output color halftone image. In one embodiment, a cyan (or magenta) dot is formed in a corresponding cyan (or magenta) pixel location of the output color halftone image if the cyan (or magenta) value of the corresponding pixel of the original color image is $\geq$ the gray scale value of the corresponding element of the dither matrix; otherwise, no cyan (or magenta) dot is formed at that cyan (or magenta) pixel location in the output color halftone image.

The method then loops back to step 715. Steps 715 and 716 are repeated until the output color halftone image is completely formed.

Although various illustrative embodiments of the present invention have been described herein, it should be understood that many variations, modifications, and alternative embodiments thereof that may appear to those having ordinary skill in the pertinent art are encompassed by the present invention, as defined by the appended claims. For example, it will be appreciated by those having ordinary skill in the pertinent art that all of the filtering operations described herein can be implemented in the frequency domain by using Fast Fourier Transforms (FFTs). In this regard, the circular convolution of a filter F(x) with a halftone pattern G(x) is given by the following equation (11):

$$\text{IFFT}(\text{FFT}(F(x))\text{FFT}(G(x))), \tag{11}$$

where IFFT denotes the inverse FFT.

For a more detailed understanding of circular convolution implemented in the frequency domain, reference can be made to the book entitled "Multidimensional Digital Signal Processing," by D. E. Dudgeon and R. M. Meersereau, published by Prentice Hall, Inc., Englewood Cliffs, N.J. (1984), the disclosure of which is incorporated herein by reference.

What is claimed is:

1. A method for generating a dither matrix for converting a gray scale image having N gray levels into a halftone image, comprising:

using a parametric filter to generate a dither halftone pattern for each gray level $G_i > G_t$, where N>2, $G_t$ represents a transition gray level, the lightest gray level is G0, the darkest gray level is $G_{N-1}$, and $G_t \geq G_0$, the parametric filter based upon a desired spot profile function of the halftone image, wherein the spot profile function is $f_{Gi}(X)$; and, the parametric filter is $F_{Gi}(x)=(1-\alpha)*(\log f_{Gi}(x)/\log f_{Gi}(0)) + \alpha e^{-x^2}$, where $\alpha \in [0,1]$, $\alpha$ is a parameter that represents a trade-off between uniform dot growth and optimum halftone statistics as defined by the spot profile function $f_{Gi}(x)$, and x represents units of average inter-minority pixel distance X; and, using the generated dither halftone pattern to generate the dither matrix.

2. The method as set forth in claim 1, wherein the spot profile function defines desired spatial halftone statistics of the halftone image.

3. The method as set forth in claim 1, wherein the spot profile function defines a desired radial and/or non-radial distribution of minority pixels in the halftone image.

4. The method as set forth in claim 1, wherein the spot profile function defines a desired statistical distribution of dots in the halftone image.

5. The method as set forth in claim 1, wherein the for all gray levels $G_i \leq G_t$, the average inter-minority pixel distance $X = 1/\text{sq. rt.} (G_i/G_{max})$; for all gray levels $G_t < G_i < G_{max} - G_t$, the average inter-minority pixel distance X is held constant; and, for all gray levels $G_i \geq G_{max} - G_t$, the average inter-minority pixel distance $X = 1/\text{sq. rt.} (1 - G_i/G_{max})$.

6. The method as set forth in claim 1, wherein the parametric linear filter is adjustable to shape an impulse response thereof.

7. The method as set forth in claim 1, wherein the parametric filter comprises a first parametric filter, and further comprising using a second parametric filter different than the first parametric filter to generate a dither halftone pattern for the transition gray level $G_t$.

8. The method as set forth in claim 7, wherein the first parametric filter produces dot clustering, and the second parametric filter does not produce dot clustering.

9. The method as set forth in claim 1, further comprising using using a Gaussian filter to generate a dither halftone pattern for the transition gray level $G_t$.

10. The method as set forth in claim 7, wherein $G_0 < G_t < G_{N-1}$.

11. The method as set forth in claim 1, wherein the parametric filter is of a type that has a local maxima at a location other than its center.

12. The method as set forth in claim 1, wherein the parametric filter is a linear filter that has peaks occurring away from a current pixel.

13. The method as set forth in claim 1, wherein the halftone patterns generated using the parametric filter comprise stochastic clustered-dot halftone patterns.

14. The method as set forth in claim 13, wherein the parametric filter is a linear filter.

15. The method as set forth in claim 9, wherein the Gaussian filter is a Gaussian low-pass filter that has a local maxima at its center.

16. The method as set forth in claim 15, wherein the parametric filter has a local minima at its center.

17. The method as set forth in claim 15, wherein the parametric filter has a local maxima at a location other than its center.

18. The method as set forth in claim 1, further comprising generating a dither halftone pattern for the transition gray level $G_t$.

19. The method as set forth in claim 18, wherein the using the generated dither halftone pattern to form the dither matrix comprises combining all of the generated dither halftone patterns to form the dither matrix.

20. The method as set forth in claim 1, further comprising generating a dither halftone pattern for each gray level $G_i \leq G_t$.

21. The method as set forth in claim 20, further wherein the using the generated dither halftone pattern to form the dither matrix comprises combining all of the generated dither halftone patterns to form the dither matrix.

22. The method as set forth in claim 18, further comprising generating a dither array for each gray level $G_i > G_t$ based upon the dither halftone pattern generated for the respective gray level $G_i$.

23. The method as set forth in claim 22, further comprising generating a dither array for the transition gray level $G_t$.

24. The method as set forth in claim 23, further comprising combining all of the generated dither arrays to form the dither matrix.

25. The method as set forth in claim 20, further comprising generating a dither array for each gray level $G_i > G_t$ based upon the dither halftone pattern generated for the respective gray level $G_i$.

26. The method as set forth in claim 25, further comprising generating a dither array for each gray level $G_i \leq G_t$.

27. The method as set forth in claim 26, further comprising combining all of the generated dither arrays to form the dither matrix.

28. A computer-readable storage medium having stored thereon software which when executed by a processor causes the processor to perform the method recited in claim 1.

29. A method for generating a dither matrix for converting a gray scale image having N gray levels into a halftone image, comprising:
   (a) generating a parametric filter for each gray level $G_i > G_t$, based upon a desired spot profile function of the halftone image for the respective gray level $G_i > G_t$, where N>2, $G_t$ represents a transition gray level, the lightest gray level is $G_0$, the darkest gray level is $G_{N-1}$, and $G_t \geq G_0$;
   (b) using the parametric filter for a current gray level $G_i > G_t$ to filter a dither halftone pattern for a nearest lighter gray level $G_{i-1} \geq G_t$, to thereby produce an initial filter output for the current gray level $G_i > G_t$;
   (c) locating a majority pixel where the initial filter output for the current gray level $G_i$, or the updated filter output$_n$ produced during the previous iteration of step (g), is minimum, for all gray levels $G_i \leq 0.5\, G_{max}$, or locating a minority pixel where the initial filter output for the current gray level $G_i$, or the updated filter output$_n$ produced during the previous iteration of step (g), is maximum, for all gray levels $G_i > 0.5\, G_{max}$, where n represents a current iteration of steps (c)-(g);
   (d) converting the majority pixel identified in step (c) to a minority pixel, for all gray levels $G_i \leq 0.5\, G_{max}$, or converting the minority pixel identified in step (c) to a majority pixel, for all gray levels $G_i > 0.5\, G_{max}$;
   (e) determining whether an appropriate ratio of minority pixels/total pixels for the current gray level $G_i$ has been achieved by virtue of the last conversion of a majority pixel to a minority pixel, or vice versa, in step (d), and if the answer is "no," then proceeding to step (f);
   (f) shifting the parametric filter for the current gray level $G_i$, to thereby generate a circularly shifted parametric filter;
   (g) adding the circularly shifted parametric filter generated in step (f) to the initial filter output for the current gray level $G_i$, or to the updated filter output$_{n-1}$ produced during the previous iteration of step (g), for all gray levels $G_i \leq 0.5\, G_{max}$, or subtracting the circularly shifted parametric filter generated in step (f) from the initial filter output for the current gray level $G_i$, or the updated filter output$_{n-1}$ produced during the previous iteration of step (g), for all gray levels $G_i > 0.5\, G_{max}$, to thereby produce an updated filter outputs for the current iteration of steps (c)-(g);
   (h) repeating steps (c)-(g) until the answer in step (e) becomes "yes", to thereby generate a dither halftone pattern for the current gray level $G_i$;
   (i) when the answer in step (e) becomes "yes," repeating steps (b)-(h) for the next darker gray level $G_{i+1}$; and,
   (j) repeating steps (b)-(i) until a dither halftone pattern has been generated for all gray levels $G_i > G_t$.

30. A computer-readable storage medium having stored thereon software which when executed by a processor causes the processor to perform the method recited in claim 29.

31. Apparatus for converting a gray scale image having N gray levels into a halftone image, comprising:

a processor that:

generates a parametric filter based upon a desired spot profile function of the halftone image; and, uses the parametric filter to generate a dither halftone pattern for each gray level $G_i > G_t$, where $N > 2$, $G_t$ represents a transition gray level, the lightest gray level is $G_0$, the darkest gray level is $G_{N-1}$, and $G_t \geq G_0$, the parametric filter based upon a desired spot profile function of the halftone image, wherein the spot profile function is $f_{Gi}(X)$; and, the parametric filter is $F_{Gi}(x) = (1-\alpha) \ast (\log f_{Gi}(x)/\log f_{Gi}(0)) + \alpha e^{-x^2}$, where $\alpha \in [0,1]$, $\alpha$ is a parameter that represents a trade-off between uniform dot growth and optimum halftone statistics as defined by the spot profile function $f_{Gi}(x)$, and x represents units of average inter-minority pixel distance X.

32. The apparatus as set forth in claim 31, wherein the processor also generates a dither array for each gray level $G_i > G_t$ by assigning a gray scale value to each element of the dither halftone pattern generated for the respective gray level $G_i > G_t$.

33. The apparatus as set forth in claim 32, wherein the processor also:

generates a dither halftone pattern for each gray level $G_i \leq G_t$; generates a dither array for each gray level $G_j \leq G_t$ by assigning a gray scale value to each element of the dither halftone pattern generated for the respective gray level $G_i \leq G_t$; and combines all of the generated dither arrays to form a dither matrix comprised of a plurality of elements each having a gray scale value.

34. The apparatus as set forth in claim 33, wherein the processor also compares the value of each pixel in the gray scale image with the gray scale value of a respective element of the dither matrix.

35. The apparatus as set forth in claim 34, further comprising a printing engine that prints a dot or not in each pixel location of the halftone image depending upon the result of the comparison made between a respective pixel of the gray scale image and a respective element of the dither matrix.

36. A method for generating a dither matrix for converting a color image having N gray levels into a color halftone image, comprising:

generating a matrix-valued parametric filter for each gray level based upon a desired colorant spot profile function of the color halftone image, wherein the spot profile function is $f_{Gi}(X)$; and, the parametric filter is $F_{Gi}(x) = (1-\alpha) \ast (\log f_{Gi}(x)/\log f_{Gi}(0)) + \alpha e^{-x^2}$, where $\alpha \in [0,1]$, $\alpha$ is a parameter that represents a trade-off between uniform dot growth and optimum halftone statistics as defined by the spot profile function $f_{Gi}(x)$, and x represents units of average inter-minority pixel distance X for each respective gray level, with respect to at least two colorants of the color halftone image; and, using the matrix-valued parametric filter to generate a joint colorant dither array for each gray level $G_i > G_t$, where $N > 2$, $G_t$ represents a transition gray level, the lightest gray level is $G_0$, the darkest gray level is $G_{N-1}$, and $G_t \geq G_0$.

37. A computer-readable storage medium having stored thereon software which when executed by a processor causes the processor to perform the method recited in claim 36.

38. A method for generating a dither matrix for converting a color image having N gray levels into a color halftone image, comprising:

generating a set of parametric filters for each gray level based upon a desired colorant spot profile function of the color halftone image, wherein the spot profile function is $f_{Gi}(X)$; and, the parametric filter is $F_{Gi}(x) = (1-\alpha) \ast (\log f_{Gi}(x)/\log f_{Gi}(0)) + \alpha e^{-x^2}$, where $\alpha \in [0,1]$, $\alpha$ is a parameter that represents a trade-off between uniform dot growth and optimum halftone statistics as defined by the spot profile function $f_{Gi}(x)$, and x represents units of average inter-minority pixel distance X for each respective gray level, with respect to at least two colorants of the color halftone image; and, using the set of parametric filters to generate a colorant dither array for each of the at least two colorants, for each gray level $G_i > G_t$, where $N > 2$, $G_t$ represents a transition gray level, the lightest gray level is $G_0$, the darkest gray level is $G_{N-1}$, and $G_t \geq G_0$.

* * * * *

UNITED STATES PATENT AND TRADEMARK OFFICE
CERTIFICATE OF CORRECTION

PATENT NO. : 7,420,709 B2  Page 1 of 1
APPLICATION NO. : 10/427766
DATED : September 2, 2008
INVENTOR(S) : Niranjan Damera-Venkata It is certified that error appears in the above-identified patent and that said Letters Patent is hereby corrected as shown below:

In column 14, line 50, in Claim 1, delete "G0" and insert -- $G_0$ --, therefor.

In column 14, line 51, in Claim 1, delete "$G_t$." and insert -- $G_t$ --, therefor.

In column 14, lines 53-54, in Claim 1, before "and," delete "$f_{Gi}(X)$;" and insert -- $f_{Gi}(x)$; --, therefor.

In column 15, line 8, in Claim 5, delete "$G_i$." and insert -- $G_i$ --, therefor.

In column 15, line 22, in Claim 9, delete "using" before "a Gaussian".

In column 16, line 56, in Claim 29, delete "outputs" and insert -- $output_n$ --, therefor.

In column 17, line 11, in Claim 31, delete "$f_{Gi}(X)$" and insert -- $f_{Gi}(x)$ --, therefor.

In column 18, line 4, in Claim 36, delete "$f_{Gi}(X)$" and insert -- $f_{Gi}(x)$ --, therefor.

In column 18, line 28, in Claim 38, delete "$f_{Gi}(X)$" and insert -- $f_{Gi}(x)$ --, therefor.

Signed and Sealed this

Twentieth Day of January, 2009

JON W. DUDAS
*Director of the United States Patent and Trademark Office*